United States Patent
Ji et al.

(10) Patent No.: US 12,224,809 B1
(45) Date of Patent: Feb. 11, 2025

(54) OTA TEST METHOD FOR VEHICLE ANTENNA SYSTEM, DEVICE, AND STORAGE MEDIUM

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN); CATARC AUTOMOTIVE TEST CENTER (GUANGZHOU) CO., LTD., Guangzhou (CN)

(72) Inventors: Guotian Ji, Tianjin (CN); Hang Sun, Tianjin (CN); Jinfeng Gong, Tianjin (CN); Zhao Wang, Tianjin (CN); Hui Rong, Tianjin (CN); Guokai Jiang, Tianjin (CN); Jiaxu Feng, Tianjin (CN); Hanbing Wu, Tianjin (CN); Yifu Ding, Tianjin (CN); Zhiruo Zhang, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN); CATARC AUTOMOTIVE TEST CENTER (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 18/756,456

(22) Filed: Jun. 27, 2024

(30) Foreign Application Priority Data

Jan. 15, 2024 (CN) .......................... 202410050096.6

(51) Int. Cl.
*H01Q 1/32* (2006.01)
*G01R 29/10* (2006.01)
(Continued)

(52) U.S. Cl.
CPC ............ *H04B 17/18* (2015.01); *H04B 17/102* (2015.01); *H04B 17/203* (2023.05); *H04B 17/296* (2023.05); *H04B 17/347* (2023.05)

(58) Field of Classification Search
CPC ... H01Q 1/24; H01Q 1/38; H01Q 1/32; H04B 17/10; H04B 17/102; H04B 17/15;
(Continued)

(56) References Cited

U.S. PATENT DOCUMENTS 4,725,843 A * 2/1988 Suzuki ................. H01Q 1/3275
342/359
6,657,589 B2 * 12/2003 Wang ........................ H01Q 1/42
343/781 R
(Continued)

FOREIGN PATENT DOCUMENTS

CN 101605350 A 12/2009
CN 103702336 A 4/2014
(Continued)

OTHER PUBLICATIONS

Feng et al., Study on the Performance Test Method of Vehicle-Level AM/FM Antenna System, China Auto, 2021 (06), pp. 51-56 and 63, dated Jun. 21, 2021.
(Continued)

*Primary Examiner* — Tho G Phan
(74) *Attorney, Agent, or Firm* — Westbridge IP LLC

(57) ABSTRACT

Disclosed are an OTA test method for a vehicle antenna system, a device and a storage medium. According to the method, the radio frequency performance of a physical layer of a whole vehicle antenna system can be tested, and the
(Continued)

problem in the prior art that the test result of parts cannot accurately reflect the performance of the whole vehicle antenna system can be solved.

9 Claims, 5 Drawing Sheets

(51) Int. Cl.
  *H04B 17/10* (2015.01)
  *H04B 17/18* (2015.01)
  *H04B 17/20* (2015.01)
  *H04B 17/29* (2015.01)
  *H04B 17/309* (2015.01)

(58) Field of Classification Search
  CPC ...... H04B 17/18; H04B 17/20; H04B 17/203; H04B 17/29; H04B 17/296; H04B 17/34; H04B 17/347
  See application file for complete search history.

(56) References Cited

U.S. PATENT DOCUMENTS

| | | | | |
|---|---|---|---|---|
| 8,077,098 | B2 * | 12/2011 | Snow | G01R 29/10 455/67.11 |
| 9,337,941 | B2 * | 5/2016 | Emerson | H01Q 21/0087 |
| 11,088,768 | B2 * | 8/2021 | Kildal | H04B 17/29 |
| 11,693,038 | B2 * | 7/2023 | Ryan | G01R 29/0878 455/67.11 |
| 11,921,140 | B2 * | 3/2024 | Maruo | G01R 29/105 |
| 2020/0064442 | A1 | 2/2020 | Park et al. | |

FOREIGN PATENT DOCUMENTS

| | | |
|---|---|---|
| CN | 107479040 A | 12/2017 |
| CN | 211348444 U | 8/2020 |
| CN | 114070428 A | 2/2022 |
| CN | 114374444 A | 4/2022 |
| CN | 114839457 A | 8/2022 |
| CN | 116027361 A | 4/2023 |
| CN | 116032382 A | 4/2023 |
| CN | 116054964 A | 5/2023 |
| CN | 117388583 A | 1/2024 |

OTHER PUBLICATIONS

First Office Action issued in counterpart Chinese Patent Application No. 202410050096.6, dated Feb. 21, 2024.
Jiang et al., Study on System Design and Variation of Vehicle Antenna Eccentricity test, 2020 International Conference on Applied Mechanics and Mechanical Engineering (ICAMME 2020), 2021, vol. 1798, No. 1, 012052, pp. 1-10, dated Feb. 1, 2021.
Zhu et al., Comparing and Analysis of Test and Evaluation Methods for Connected Vehicle Communication Antenna System, Issue No. Start2021 International Conference on Power Electronics and Power Transmission (ICPEPT 2021), 2021, vol. 2108, No. 1, 012007, pp. 1-8, dated Nov. 1, 2021.

* cited by examiner

OTA TEST METHOD FOR VEHICLE ANTENNA SYSTEM, DEVICE, AND STORAGE MEDIUM

CROSS-REFERENCE TO RELATED APPLICATIONS

This application claims priority to China Patent Application No. 202410050096.6, titled "OTA Test Method for Vehicle Antenna System, Device and Storage Medium", filed on Jan. 15, 2024 in the China National Intellectual Property Administration (CNIPA), the entire content of which is hereby incorporated by reference in its entirety.

TECHNICAL FIELD

The present disclosure relates to the technical field of measurement, and in particular to an over the air (OTA) test method for a vehicle antenna system, a device and a storage medium.

BACKGROUND

With the deep integration of automobile industry, electronic industry and communication industry, consumers' demand for automobiles has changed from the simple demand for walk-replacing tools to the demand with more emphasis on safety, comfort and intelligence. Therefore, the vehicle-mounted wireless communication function has been greatly developed. As an indispensable and important transformation apparatus of a wireless communication system, an antenna shoulders the function of mutual transformation between transmission line guide wave and space electromagnetic wave. The radio frequency performance of a vehicle-mounted antenna system directly affects the performance of vehicle cellular wireless communication, direct communication and global satellite navigation, so main engine plants and antenna suppliers pay more and more attention to the development and test of the antenna system.

The performance test of antenna parts is usually performed in the prior art. However, the performance of the whole vehicle antenna system is affected by various factors. Due to the influence of the configuration of the antenna mounting position, the vehicle body material, the mounting angle, the harness wiring layout, the vehicle shielding reflection and other electronic systems of the vehicle, the test result of the antenna parts cannot accurately reflect the performance of the whole vehicle antenna system.

In view of this, the present disclosure is proposed.

SUMMARY

To solve the above technical problem, the present disclosure provides an OTA test method for a vehicle antenna system, a device and a storage medium, so that a whole vehicle antenna system can be tested, and the problem in the prior art that the test result of parts cannot accurately reflect the performance of the whole vehicle antenna system can be solved.

Embodiments of the present disclosure provide an OTA test method for a vehicle antenna system, applied to an OTA test system. The OTA test system includes a reflecting surface, a reflecting surface bracket, a feed antenna, a feed turntable, a feed fixing bracket, a feed lifting apparatus, a feed sliding track, a feed switcher, a feed bracket controller, a rotary table, a left lifting arm, a right lifting arm, a vehicle fixing turntable, a rotating shaft, a driving motor, a vehicle attitude controller and a measuring device. The method includes:

controlling, by the vehicle attitude controller, the rotating angle of the rotary table, the rotating angle of the vehicle fixing turntable and the rotating angle of the rotating shaft to obtain the current vehicle body attitude of the vehicle to be tested and placed on the vehicle fixing turntable;

controlling the vehicle antenna system in the vehicle to be tested to transmit a first test signal to enable the first test signal to pass through the reflecting surface and the feed antenna and arrive at the measuring device, obtaining an average carrier power, and determining the antenna system radiated power of the vehicle antenna system in the current vehicle body attitude based on the average carrier power;

controlling the feed antenna to transmit a second test signal to enable the second test signal to pass through the reflecting surface and arrive at the vehicle antenna system, adjusting the transmitting power of the second test signal by the measuring device until the packet loss rate of the vehicle antenna system reaches a preset value, recording the current transmitting power, and determining a receiving sensitivity of the vehicle antenna system in the current vehicle body attitude based on the current transmitting power.

The embodiments of the present disclosure provide an electronic device. The electronic device includes:

a processor and a memory, where the processor is configured to perform the steps of the OTA test method for a vehicle antenna system according to any embodiment by calling a program or an instruction stored by the memory.

The embodiments of the present disclosure further provide a computer-readable storage medium. The computer-readable storage medium stores a program or an instruction. The program or instruction enables a computer to perform the steps of the OTA test method for a vehicle antenna system according to any embodiment.

The embodiments of the present disclosure have the following technical effects:

the rotating angle of the rotary table in the OTA test system, the rotating angle of the vehicle fixing turntable and the rotating angle of the rotating shaft are controlled by the vehicle attitude controller in the OTA test system, so that the current vehicle body attitude of the vehicle to be tested and placed on the vehicle fixing turntable is obtained, the vehicle antenna system in the vehicle to be tested is controlled to transmit the first test signal, the first test signal passes through the reflecting surface and the feed antenna in the OTA test system and then arrives at the measuring device; the average carrier power is obtained; the antenna system radiated power of the vehicle antenna system in the current vehicle body attitude is determined based on the average carrier power, so that the radiated power of the whole vehicle system can be tested; the feed antenna is controlled to transmit the second test signal, so that the second test signal passes through the reflecting surface and arrives at the vehicle antenna system; the transmitting power of the second test signal is adjusted by the measuring device until the packet loss rate of the vehicle antenna system reaches the preset value; the current transmitting power is recorded, so that the receiving sensitivity of the vehicle antenna system in the current vehicle body state is determined, and the receiving sensitivity of the whole vehicle antenna system can be tested; according to the method, the whole vehicle antenna system is subjected to attitude adjustment and test, so that the radio frequency performance of the physical layer of the whole vehicle antenna system can be tested, and the problem in the prior art that the test result of the parts cannot accurately reflect the performance of the whole vehicle antenna system; in addition, according to the method, the radiated powers and the receiving sensitivities of the whole vehicle antenna system in different vehicle body attitudes can be tested, so that the transmitting ability and the receiving ability of the whole vehicle antenna system can be tested, and the stability and reliability of the communication performance of the intelligent connected vehicle antenna system can be effectively ensured.

BRIEF DESCRIPTION OF THE DRAWINGS

To more clearly describe the technical solutions of the specific embodiments of the present disclosure or in the prior art, the accompanying drawings required to describe the specific embodiments or the prior art are briefly described below. Apparently, the accompanying drawings described below are some embodiments of the present disclosure. Those of ordinary skill in the art may further obtain other accompanying drawings based on these accompanying drawings without inventive effort.

DETAILED DESCRIPTION OF THE EMBODIMENTS

To make the objective, technical solutions and advantages of the embodiments of the present disclosure clearer, the technical solutions of the present disclosure will be clearly and completely described below. Apparently, the embodiments described are merely some embodiments rather than all embodiments of the present disclosure. Based on the embodiments of the present disclosure, all other embodiments obtained by those of ordinary skill in the art without creative efforts shall fall within the protection scope of the present disclosure.

An OTA test method for a vehicle antenna system provided by the embodiments of the present disclosure is mainly applicable to active OTA test of a whole vehicle antenna system, such as the radiated power and the receiving sensitivity of the whole vehicle antenna system. The OTA test method for a vehicle antenna system provided by the embodiments of the present disclosure may be applied to an OTA test system.

Figure 1:
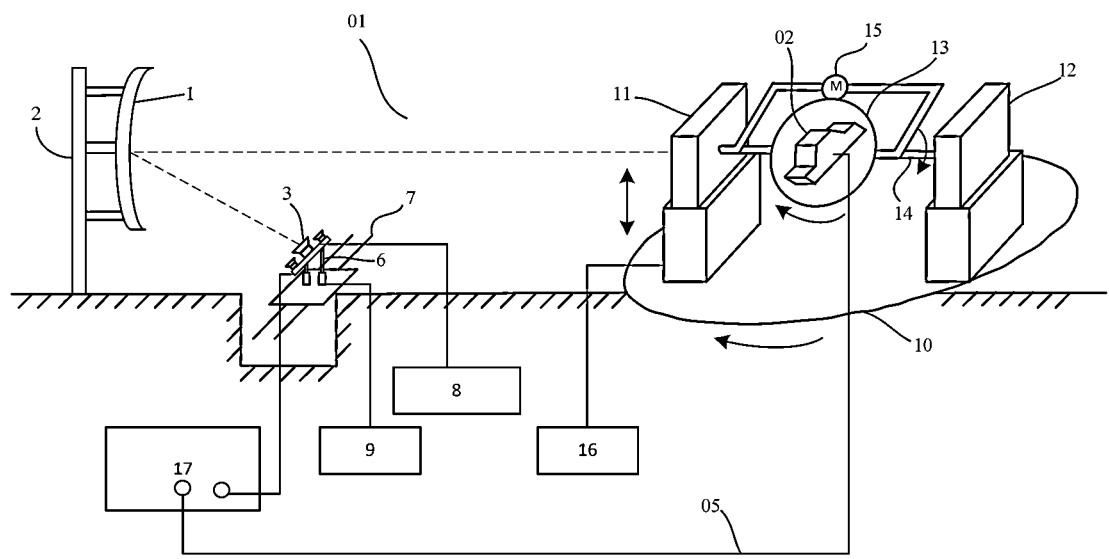
FIG. 1 is a structural schematic diagram of an OTA test system according to an embodiment of the present disclosure.
Figure 2A:
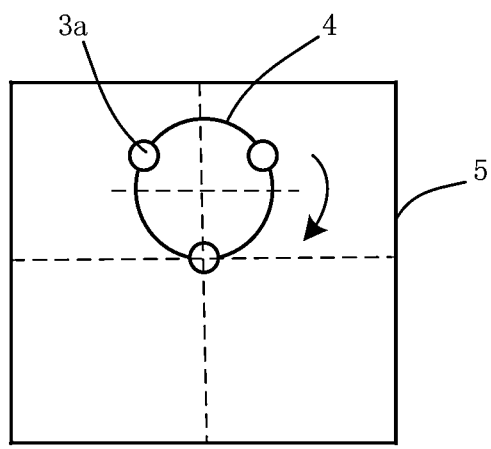
FIG. 2a is a schematic diagram of a position relationship between a feed turntable and a probe of a feed antenna according to an embodiment of the present disclosure.
Figure 2B:
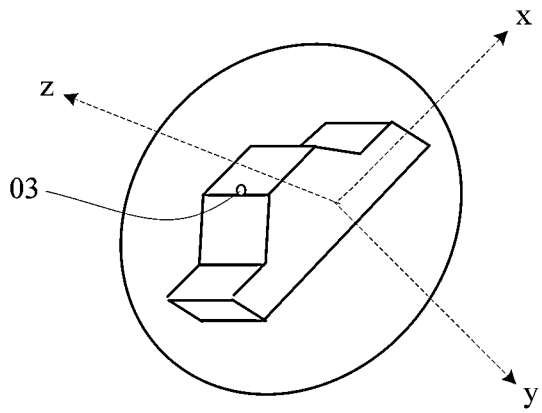
FIG. 2b is a structural schematic diagram of a vehicle to be tested according to an embodiment of the present disclosure.

As shown in FIG. 1, FIG. 2a and FIG. 2b, the OTA test system includes a reflecting surface 1, a reflecting surface bracket 2, a feed antenna 3, a feed turntable 4, a feed fixing bracket 5, a feed lifting apparatus, 6, a feed sliding track 7, a feed switcher 8, a feed bracket controller 9, a rotary table 10, a left lifting arm 11, a right lifting arm 12, a vehicle fixing turntable 13, a rotating shaft 14, a driving motor 15, a vehicle attitude controller 16 and a measuring device 17. The vehicle fixing turntable 3 is configured to fix a vehicle 02 to be tested or a reference antenna 04.

The reflecting surface 1 may be configured to perform conversion on spherical waves and planar waves. The reflecting surface bracket 2 is configured to fix the angle and height of the reflecting surface 1 and prevent the reflecting surface 1 from being deformed. The feed antenna 3 is located on the feed turntable 4, located at the focus of the reflecting surface 1 and configured to transmit and receive radio frequency signals. The feed turntable 4 is configured to mount a plurality of probes of the feed antenna 3, and probe rotation and electric connection switching of the antennas can be realized through control. The feed fixing bracket 5 is configured to place the feed turntable 4, that is, be connected to the feed turntable 4. The feed lifting apparatus 6 is placed below the feed fixing bracket 5, and can adjust the height and pitch angle of the feed antenna 3 by adjusting the height and pitch angle of the feed fixing bracket 5. The feed sliding track 7 is placed below the feed lifting apparatus 6. The feed lifting apparatus 6 can move on the feed sliding track 7 so as to adjust the horizontal position of the probes of the feed antenna.

The feed switcher 8 can be electrically connected to the feed fixing bracket 5. The feed switcher 8 can control the feed turntable 4 to rotate, and rotate the feed antenna to be used to the focus of the reflecting surface 1, thereby switching the feed antenna. As shown in FIG. 2, three probes of the feed antenna are arranged on the feed turntable 4, and the feed turntable 4 can rotate clockwise, so that one of the probes is rotated to the focus (, that is, the center position of the feed fixing bracket 5) of the reflecting surface 1.

The feed bracket controller 9 can send an instruction to the feed lifting apparatus 6, so that the feed lifting apparatus 6 adjusts the height and pitch angle of the feed fixing bracket 5, or the feed lifting apparatus 6 moves on the feed sliding track 7.

A left lifting arm 11, a right lifting arm 12, a vehicle fixing turntable 13, a rotating shaft 14 and a driving motor 15 may be built on the rotary table 10. The rotary table 10 can adjust the horizontal angle of the vehicle fixing turntable 13 through the rotation in a horizontal direction (that is, an X axis in a vehicle head direction).

The left lifting arm 11 and the right lifting arm 12 may cooperate with each other for controlling the lifting height of the vehicle on the vehicle fixing turntable 13. The vehicle fixing turntable 13 can rotate in a Z axis in a vehicle top direction, thereby switching the angle of the vehicle. The rotating shaft 14 can rotate in a Y axis in a lateral direction of the vehicle, thereby switching the angle of the vehicle. The driving motor 15 is configured to drive the vehicle fixing turntable 13 to rotate.

The vehicle attitude controller 16 can send instructions to the rotary table 10, the left lifting arm 11, the right lifting arm 12, the vehicle fixing turntable 13, the rotating shaft 14 and the driving motor 15, so that the left lifting arm 11 and the right lifting arm 12 can control the lifting height of the vehicle, and the rotary table 10, the vehicle fixing turntable 13 and the rotating shaft 14 can respectively adjust the angles of the vehicle in different directions, thereby adjusting the vehicle body attitude.

The measuring device 17 may include two ports, that is, a feed connecting port 172 and an antenna system connecting port 171, where the feed connecting port 172 may be connected to the feed turntable 4 so as to measure the feed antenna 3; and the antenna system connecting port 171 may be connected to the vehicle antenna system 03 of the vehicle 02 to be tested so as to measure the vehicle antenna system 03.

The OTA test system can test the radio frequency performance of the vehicle antenna system composed of the whole vehicle structure, antenna, terminal and harness, evaluate the test items such as the transmitting power and the receiving sensitivity, and ensure the healthy development of the related functions of Internet of Vehicles. Furthermore, the OTA test system has the advantages of exquisite structure, convenient operation, high accuracy and the like, has extremely high industrial application value, and can meet the test application requirement at the present stage.

Figure 3A:
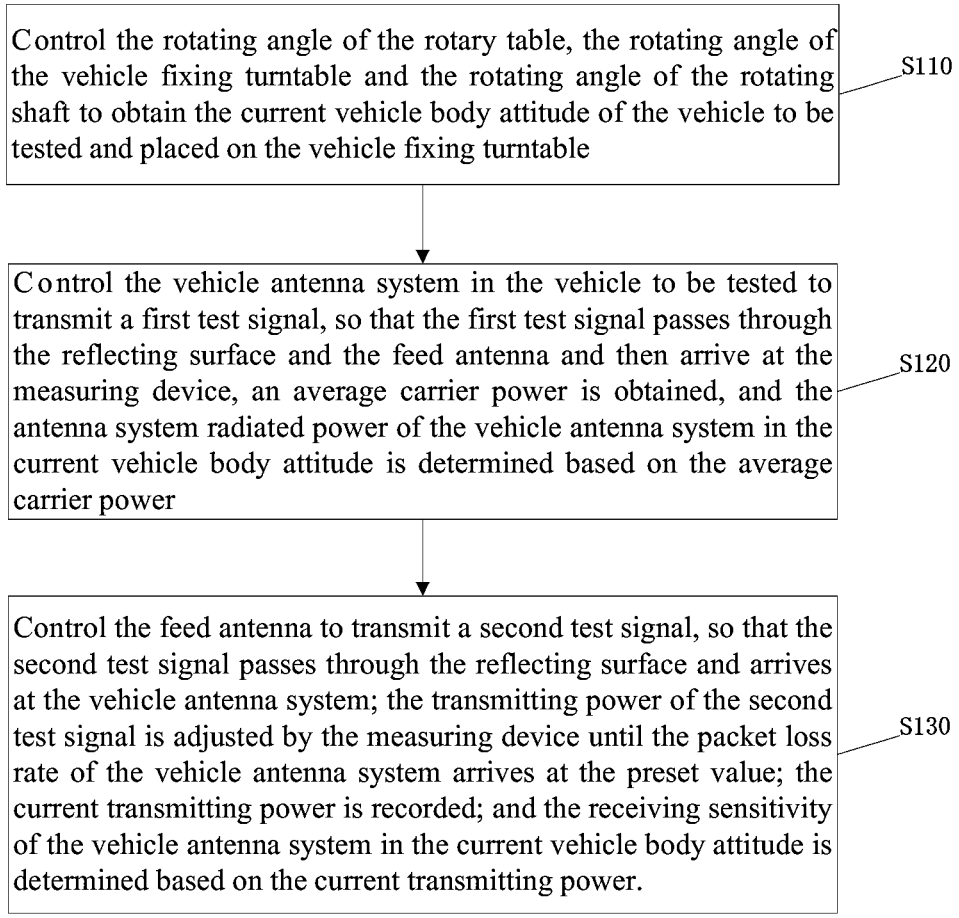
FIG. 3a is a flowchart I of an OTA test method for a vehicle antenna system according to an embodiment of the present disclosure.

FIG. 3a is a flowchart I of an OTA test method for a vehicle antenna system according to an embodiment of the present disclosure. The method may be performed by an electronic device such as a computer. As shown in FIG. 1 and FIG. 3a, the OTA test method for the vehicle antenna system specifically includes:

S110: the vehicle attitude controller controls the rotating angle of the rotary table, the rotating angle of the vehicle fixing turntable and the rotating angle of the rotating shaft to obtain the current vehicle body attitude of the vehicle to be tested and placed on the vehicle fixing turntable.

Specifically, a control signal may be sent to the vehicle attitude controller 16 in an OTA test system according to the current vehicle body attitude to be tested, so that the vehicle attitude controller 16 sends instructions to the rotary table 10, the driving motor 15 and the rotating shaft 14, the rotary table 10 rotates, the driving motor 15 drives the vehicle fixing turntable 13 to rotate, and the rotating shaft 14 rotates, thereby adjusting the rotating angles of the rotary table 10, the vehicle fixing turntable 13 and the rotating shaft 14, and adjusting the vehicle body attitude.

It should be noted that the rotary table 10, the vehicle fixing turntable 13 and the rotating shaft 14 rotate in different directions in space, and the vehicle to be tested on the vehicle fixing turntable 13 can be adjusted to any vehicle body attitude by controlling the rotating angles of the rotary table 10, the vehicle fixing turntable 13 and the rotating shaft 14, so that the whole vehicle antenna system can be tested more completely, and the test result is more accurate and reliable.

In the embodiments of the present disclosure, the current vehicle body attitude of the vehicle to be tested on the vehicle fixing turntable 13 can be obtained after the rotating angles of the rotary table 10, the vehicle fixing turntable 13 and the rotating shaft 14 are adjusted.

The current vehicle body attitude may include a current azimuth angle and a current pitch angle. The azimuth angle may be understood as the angle of the vehicle head changing along the left and right sides, that is, the angle of the vehicle body rotating left and right. The pitch angle may be understood as the angle of the vehicle head changing along the vehicle top or the vehicle bottom, that is, the angle of the vehicle body swinging up and down.

Further, the antenna system radiated power and the receiving sensitivity in the current vehicle body attitude can be measured after the vehicle body attitude of the vehicle to be tested is adjusted. Considering that there may be a path loss when the measuring device 17 performs measurement, to further improve the test accuracy, the path loss of the measuring device 17 can be calibrated before the antenna system radiated power and the receiving sensitivity are measured, so that the path loss of the measuring device 17 can be obtained.

Figure 3B:
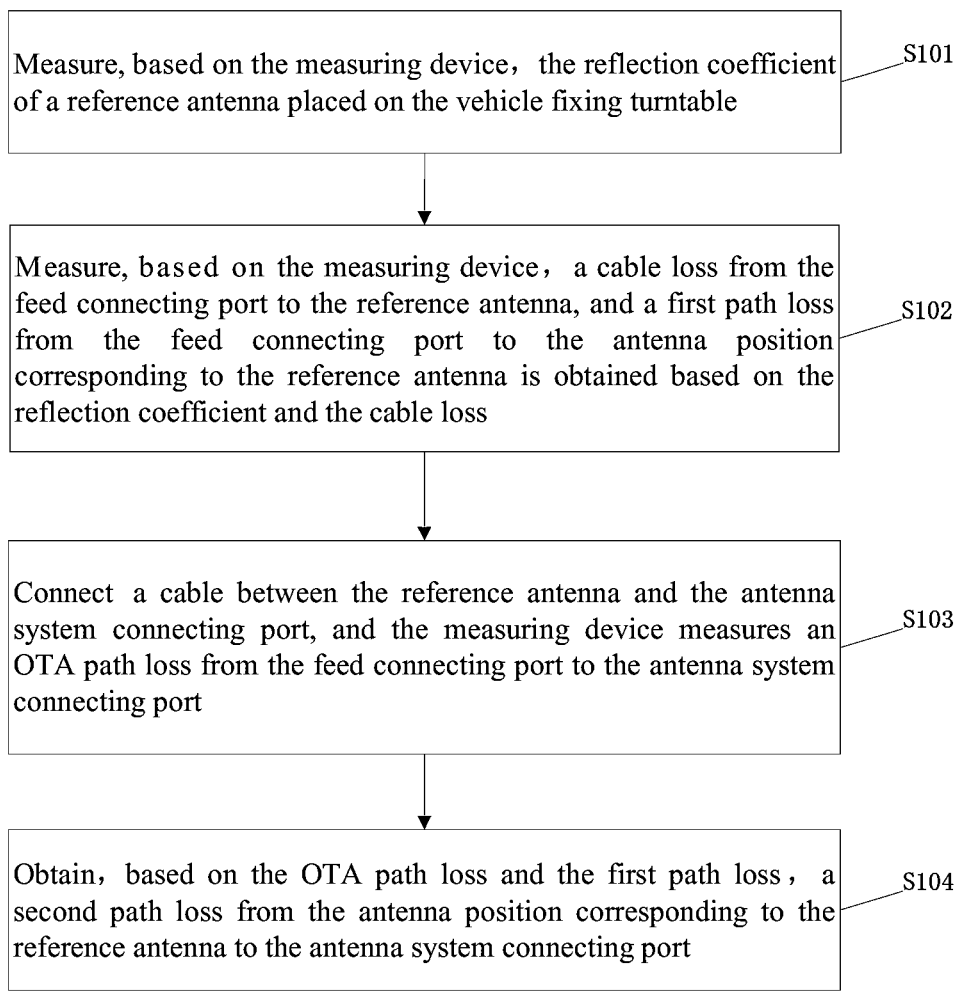
FIG. 3b is a flowchart II of an OTA test method for a vehicle antenna system according to an embodiment of the present disclosure.

In a specific embodiment, the measuring device includes a feed connecting port 172 and an antenna system connecting port 171. FIG. 3b is a flowchart II of an OTA test method for a vehicle antenna system according to an embodiment of the present disclosure. The method provided by the embodiments of the present disclosure further includes the following steps:

step 101: the measuring device measures the reflection coefficient of a reference antenna placed on the vehicle fixing turntable;

step 102: the measuring device measures a cable loss from the feed connecting port to the reference antenna, and a first path loss from the feed connecting port to the antenna position corresponding to the reference antenna is obtained based on the reflection coefficient and the cable loss;

step 103: a cable between the reference antenna and the antenna system connecting port is connected, and the measuring device measures an OTA path loss from the feed connecting port to the antenna system connecting port; and step 104: a second path loss from the antenna position corresponding to the reference antenna to the antenna system connecting port is obtained based on the OTA path loss and the first path loss.

Before the path loss calibration, it is necessary to remove the vehicle to be tested and placed on the vehicle fixing turntable 13, so that the reference antenna is placed on the vehicle fixing turntable 13, and the reference antenna coincides with the geometric center of the vehicle to be tested on the vehicle fixing turntable 13. The reference antenna may be an antenna with the known efficiency or gain value and is configured to perform path loss calibration, for example, a standard gain horn antenna.

Figure 4:
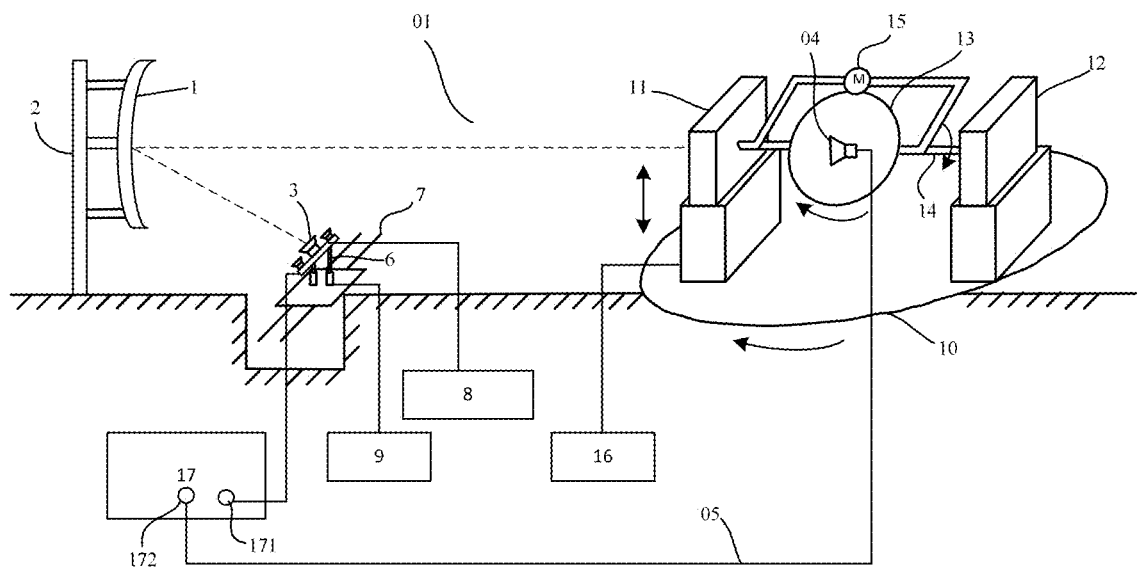
FIG. 4 is a schematic diagram of path loss calibration according to an embodiment of the present disclosure.

Exemplarily, FIG. 4 is a schematic diagram of path loss calibration according to an embodiment of the present disclosure. The feed connecting port 172 in the measuring device 17 may be connected to the feed fixing bracket 5 after the reference antenna 04 is placed.

Further, the path loss calibration of the whole transmission path from the placing position of the reference antenna to the measuring device 17 may be realized based on the reference antenna.

Specifically, in the step 101, the reflection coefficient at the antenna connection position (that is, the position where the reference antenna is placed on the vehicle fixing turntable 13) of the reference antenna may be measured by the measuring device 17. The measuring device 17 specifically may be a network analyzer or other equivalent measuring devices.

Further, in the step 102, the forward transmission coefficient (that may be indicated by S21) from the feed connecting port to the feed antenna may be measured by the measuring device 17, so that the cable loss can be calculated according to S21. The cable loss may be 20 log |S21|.

The first path loss from the feed connecting port 172 to the antenna connection position may be calculated according to the reflection coefficient and the cable loss. Exemplarily, the first path loss may be calculated by the following formula:

$$L_{SGHeal} = L_{C \leftrightarrow SGH} + 10 \log(1 - |\Gamma_{SGH}|^2) - G_{SGH}.$$

In the formula, $L_{SGHeal}$ is the first path loss, $L_{C \leftrightarrow SGH}$ is the cable loss, $\Gamma_{SGH}$ is the reflection coefficient, $10 \log (1-|\Gamma_{SGH}|^2)$ is the compensation of return loss of the standard gain horn antenna connector (reference antenna), and $G_{SGH}$ is the known gain of the standard gain horn antenna (reference antenna).

Further, in the step 103, the reference antenna may be connected to the antenna system connecting port 171 through the cable. To eliminate the polarization mismatch between the feed antenna and the reference antenna, the reference antenna may be positioned in a beam peak direction of the feed antenna.

Furthermore, a forward transmission coefficient (that can be indicated by S21, it should be noted that the S21 measured in the step 103 is different from the S21 measured in the step 102, and at this time, the S21 is the forward transmission coefficient from the feed connecting port 172 to the feed antenna, from the feed antenna to the reference antenna through OTA and from the reference antenna to the antenna system connecting port 171) from the feed connecting port 172 to the antenna system connecting port 171 is measured by the measuring device 17, so that the OTA path loss can be calculated according to the S21. The OTA path loss may be 20 log |S21|.

Further, in the step 104, a second path loss from the antenna connection position to the antenna system connecting port 171 can be calculated according to the OTA path loss and the first path loss. Exemplarily, the second path loss can be calculated by the following formula:

$$L_{A \leftrightarrow B} = L_{SGHeal} - L_{C \leftrightarrow B}$$

In the formula, LAMB is the second path loss, $L_{SGHeal}$ is the first path loss, $L_{C \leftrightarrow B}$ is the OTA path loss, A may be understood as the antenna connection position, B may be understood as the position corresponding to the antenna system connecting port 171, and C may be understood as the position corresponding to the feed connecting port 172.

By the step 101 to the step 104, the path loss can be calibrated before the radiated power and the receiving sensitivity of the whole antenna system are tested, so that when the whole antenna system is tested subsequently, a more accurate test result can be obtained in combination with the path loss, and the accuracy of the test result can be ensured.

It should be noted that after the path loss calibration is completed, it is necessary to place the vehicle to be tested on the vehicle fixing turntable 13 and connect the antenna system connecting port 171 and the vehicle antenna system on the vehicle to be tested.

S120: the vehicle antenna system in the vehicle to be tested is controlled to transmit a first test signal, so that the first test signal passes through the reflecting surface and the feed antenna and then arrive at the measuring device, an average carrier power is obtained, and the antenna system radiated power of the vehicle antenna system in the current vehicle body attitude is determined based on the average carrier power.

In the embodiments of the present disclosure, the transmitting ability of the vehicle antenna system in the vehicle to be tested can be tested after the vehicle to be tested is adjusted by the vehicle attitude controller to the current vehicle body attitude. Firstly, the vehicle antenna system in the vehicle to be tested can be aligned with the beam peak direction of the feed antenna 3; and then the transmitting branch and carrier of the vehicle antenna system can be configured sequentially according to the maximum power requirement, and the vehicle antenna system can transmit the first test signal with the maximum power and under a certain bandwidth configuration.

Further, the vehicle antenna system in the vehicle to be tested can be controlled to transmit the first test signal, so that the first test signal passes through the reflecting surface 1 to arrive at the feed antenna 3 and then passes through the feed antenna 3 to arrive at the measuring device 17. At this time, the average power of each carrier of the measuring device 17 can be obtained, that is, the average carrier power.

Further, the antenna system radiated power of the vehicle antenna system in the current vehicle body attitude can be calculated according to the average carrier power. The antenna system radiated power may be effective isotropic radiated power (EIRP), or may be referred to as equivalent isotropic radiated power. The radiated power of the transmitting antenna of the satellite and the earth station in the axial direction of the beam center may be referred to as the effective isotropic radiated power of a transmitting device, that is, the product of the power of the supply antenna of a radio transmitter and the absolute gain of the antenna in the given direction, which can reflect the transmitting ability.

Figure 3C:
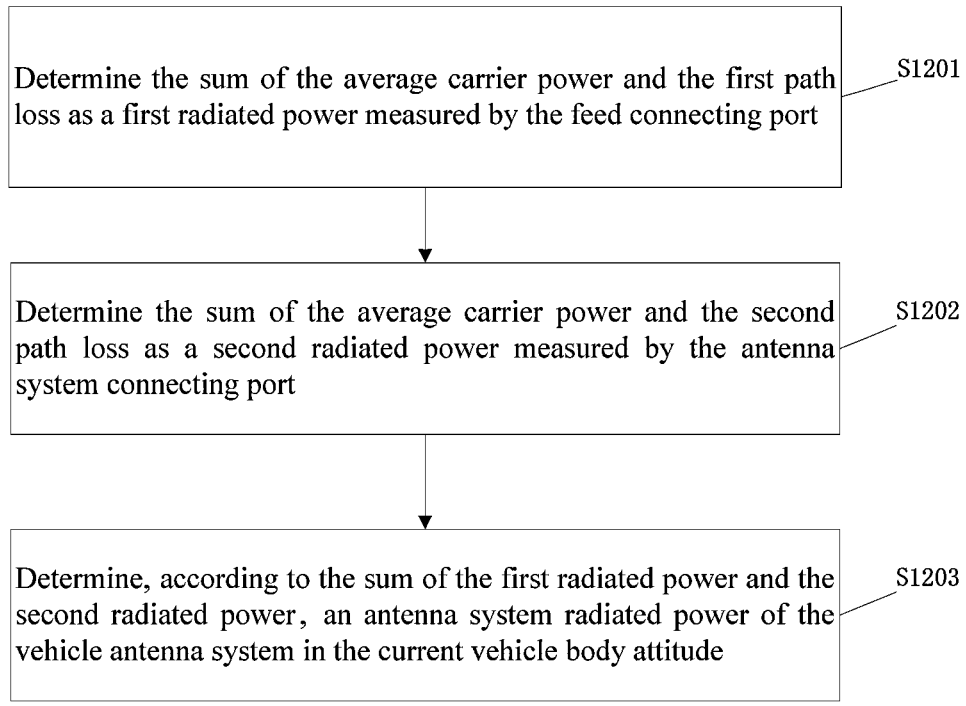
FIG. 3c is a flowchart III of an OTA test method for a vehicle antenna system according to an embodiment of the present disclosure.

FIG. 3c is a flowchart III of an OTA test method for a vehicle antenna system according to an embodiment of the present disclosure. Optionally, the step that the antenna system radiated power of the vehicle antenna system in the current vehicle body attitude is determined based on the average carrier power includes the following steps:

step 1201: the sum of the average carrier power and the first path loss is determined as a first radiated power measured by the feed connecting port;

step 1202: the sum of the average carrier power and the second path loss is determined as a second radiated power measured by the antenna system connecting port; and step 1203: an antenna system radiated power of the vehicle antenna system in the current vehicle body attitude is determined according to the sum of the first radiated power and the second radiated power.

In the step 1201 to step 1202, the sum of the average carrier power and the first path loss can serve as a first radiated power corresponding to the feed connecting port 172; and the sum of the average carrier power and the second path loss can serve as a second radiated power corresponding to the antenna system connecting port 171.

Further, the sum of the first radiated power and the second radiated power can serve as the antenna system radiated power corresponding to the current vehicle body attitude.

It should be noted that by the step 1201 to the step 1203, the radiated power of the whole antenna system can be deduced based on the test of the radiated power of the OTA test system and in combination with the path losses of two ports of the measuring device, thereby ensuring the accuracy of the measured antenna system radiated power.

S130: the feed antenna is controlled to transmit a second test signal, so that the second test signal passes through the reflecting surface and arrives at the vehicle antenna system; the transmitting power of the second test signal is adjusted by the measuring device until the packet loss rate of the vehicle antenna system arrives at the preset value; the current transmitting power is recorded; and the receiving sensitivity of the vehicle antenna system in the current vehicle body attitude is determined based on the current transmitting power.

In the embodiments of the present disclosure, in addition to testing the transmitting ability of the vehicle antenna system in the vehicle to be tested, the receiving ability of the vehicle antenna system in the vehicle to be tested can be tested. Firstly, the feed antenna 3 can be aligned with the beam peak direction of the vehicle antenna system in the vehicle to be tested; and then the transmitting branch and carrier of the feed antenna 3 can be configured sequentially according to the maximum power requirement, and the feed antenna 3 can transmit the first test signal with the maximum power and under a certain bandwidth configuration.

Specifically, the feed antenna can be controlled to transmit the second test signal, so that the second test signal passes through the reflecting surface 1 and arrives at the vehicle antenna system so as to arrive at the measuring device 17 through the cable between the vehicle antenna system and the measuring device 17, and the packet loss rate arriving at the vehicle antenna system can be measured by the measuring device 17.

Further, the transmitting power of the feed antenna 3 can be adjusted by the measuring device 17, so that the transmitting power of the feed antenna 3 is reduced sequentially until the packet loss rate arriving at the vehicle antenna system reaches to the preset value (such as 5%). At this time, the current transmitting power of the feed antenna 3 can be recorded, so that the receiving sensitivity of the vehicle antenna system in the current vehicle body attitude can be calculated according to the current transmitting power.

Figure 3D:
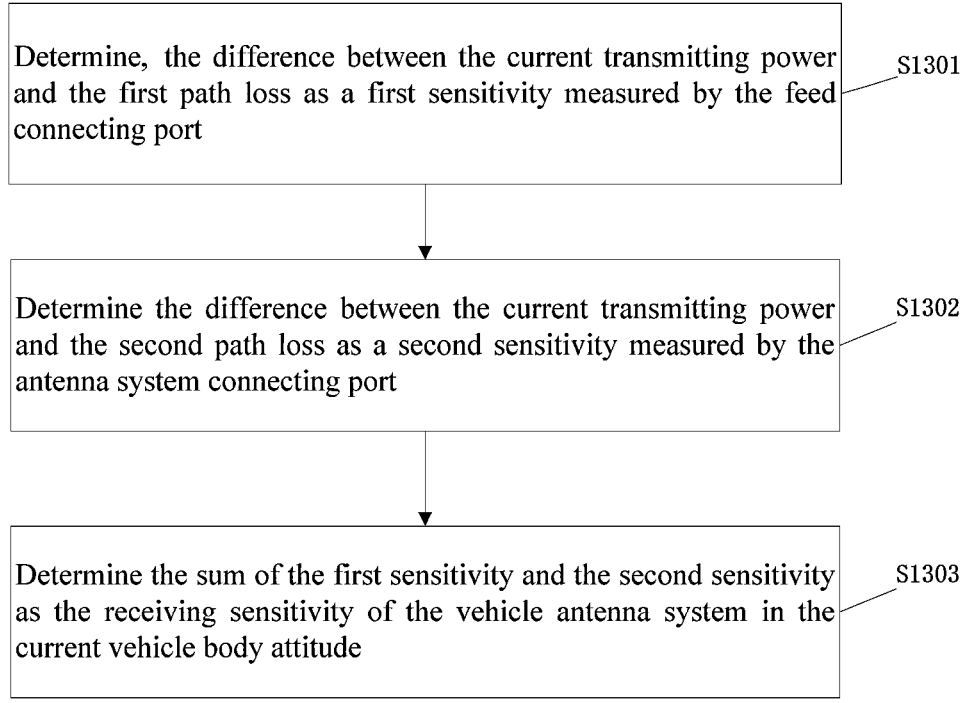
FIG. 3d is a flowchart V of an OTA test method for a vehicle antenna system according to an embodiment of the present disclosure.

FIG. 3*d* is a flowchart V of an OTA test method for a vehicle antenna system according to an embodiment of the present disclosure. Optionally, the step that the receiving sensitivity of the vehicle antenna system in the current vehicle body attitude is determined based on the current transmitting power includes the following steps:

step 1301: the difference between the current transmitting power and the first path loss is determined as a first sensitivity measured by the feed connecting port;

step 1302: the difference between the current transmitting power and the second path loss is determined as a second sensitivity measured by the antenna system connecting port; and step 1303: the sum of the first sensitivity and the second sensitivity is determined as the receiving sensitivity of the vehicle antenna system in the current vehicle body attitude.

In the step 1301 to the step 1302, the difference between the current transmitting power and the first path loss can serve as a first sensitivity corresponding to the feed connecting port 172; and the difference between the current transmitting power and the second path loss can serve as a second sensitivity corresponding to the antenna system connecting port 171.

Further, the sum of the first sensitivity and the second sensitivity can serve as the receiving sensitivity corresponding to the current vehicle body attitude.

It should be noted that by the step 1301 to the step 1303, the receiving sensitivity of the whole antenna system can be deduced based on the test of the receiving sensitivity of the OTA test system and in combination with the path losses of the two ports of the measuring device, thereby ensuring the accuracy of the measured receiving sensitivity of the antenna system.

In the embodiments of the present disclosure, the antenna system radiated power and the receiving sensitivity of the vehicle antenna system of the vehicle to be tested in one vehicle body attitude can be measured by performing S110-S130 once; and the antenna system radiated powers and the isotropic sensitivities of the vehicle antenna system in different vehicle body attitudes can be measured by performing S110-S130 many times, so that the transmitting ability and the receiving ability of the vehicle antenna system in the vehicle to be tested can be evaluated by the antenna system radiated power and the receiving sensitivity.

It should be noted that the antenna system radiated power and the receiving sensitivity of the vehicle to be tested at each azimuth angle and each pitch angle can be measured by adjusting the current vehicle body attitude of the vehicle antenna system many times, so that the transmitting ability and the receiving ability of the vehicle antenna system can be evaluated by synthesizing the antenna system radiated powers and the isotropic sensitivities at a plurality of angles, the vehicle antenna system can be tested more comprehensively, the test result is more accurate and reliable, the actual situation of the actual vehicle is met, and the test accuracy is effectively ensured.

In the embodiments of the present disclosure, in addition to adjusting a plurality of vehicle body attitudes to obtain the antenna system radiated powers and the isotropic sensitivities at different azimuth angles and pitch angles, the feed antenna can be switched, or the attitude of the feed antenna can be adjusted to realize the test at different feed antennas and different feed antenna attitudes, so that the test comprehensiveness is further ensured, and the test result is more accurate.

Optionally, before the vehicle attitude controller controls the rotating angle of the rotary table, the rotating angle of the vehicle fixing turntable and the rotating angle of the rotating shaft, the method further includes:

the feed turntable is controlled by the feed switcher to rotate, so that the feed antenna on the feed turntable is switched; or the feed lifting apparatus located below the feed fixing bracket is controlled by the feed bracket controller to slide on the feed sliding track, thereby adjusting the horizontal position of the feed antenna, controlling the feed lifting apparatus to perform lifting movement and adjusting the height and pitch angle of the feed antenna.

Specifically, a control signal can be sent to the feed switcher 8, so that the feed switcher 8 controls the feed turntable 4 to rotate, and the feed antenna required to be used on the feed turntable 4 is adjusted to the focus aligned with the reflecting surface 1. The transmitting frequency of each feed antenna on the feed turntable 4 is different, and the feed antenna required to be used can be determined according to the test requirement.

Or a control signal may be sent to the feed bracket controller 9, so that the feed bracket controller 9 controls the feed lifting apparatus 6 below the feed fixing bracket 5 to slide on the feed sliding track 7, the horizontal position of the feed antenna 3 can be adjusted, the feed bracket controller 9 controls the feed lifting apparatus 6 to perform lifting movement, and the height and pitch angle of the feed antenna 3 can be adjusted. The feed lifting apparatus 6 may be composed of a plurality of lifting columns. If the lifting heights of the plurality of lifting columns are the same at the same time, the height of the feed antenna 3 can be adjusted. If the lifting heights of the plurality of lifting columns are different, the pitch angle of the feed antenna 3 can be adjusted.

By the above optional embodiment, the feed antenna can be switched, and the attitude of the feed antenna can be adjusted, so that the receiving ability and the transmitting ability of the vehicle antenna system of the vehicle to be tested at different feed antennas or different feed antenna attitudes can be tested, thereby further ensuring the test comprehensiveness, and avoiding the error of the antenna system radiated power and the receiving sensitivity measured at the single feed antenna or the single feed antenna attitude.

In the embodiments of the present disclosure, after the antenna system radiated power and the receiving sensitivity of the vehicle antenna system of the vehicle to be tested are measured, other related parameters reflecting the performance of the vehicle antenna system can be further calculated based on the antenna system radiated power and the receiving sensitivity. For example, the radiated power diagram and the sensitivity diagram changing with the azimuth angles and the pitch angles are drawn according to the antenna system radiated power and the receiving sensitivity at each azimuth angle and each pitch angle.

In addition, in one example, the method provided by the embodiments of the present disclosure further includes:

a radiated power average value and a sensitivity average value are determined according to the antenna system radiated power and the receiving sensitivity of the vehicle antenna system in each vehicle body attitude; and the radiated power average value and the sensitivity average value are converted into a logarithmic form, and the conversion result is displayed.

Specifically, the antenna system radiated power $P_r(\theta, \phi)$ ($\theta$ represents the azimuth angle in the vehicle body attitude, and $\phi$ represents the pitch angle in the vehicle body attitude) under each vehicle body attitude can be converted into linear representation $P_r(\theta, \phi)$:

$$p_r(\theta,\phi)=10^{P_r(\theta,\phi)/10}$$

Furthermore, the receiving sensitivity $P_s(\theta, \phi)$ under each vehicle body attitude can be firstly converted into linear representation $P_s(\theta, \phi)$:

$$p_s(\theta,\phi)=10^{P_s(\theta,\phi)/10};$$

Further, the radiated power average value in the preset measuring space range can be calculated according to the antenna system radiated power linearly represented under each vehicle body attitude; and the sensitivity average value in the present angle range can be calculated according to the receiving sensitivity linearly represented under each vehicle body attitude. The preset measuring space range can describe the range of the azimuth angles and the range of the pitch angles.

Exemplarily, the radiated power average value and the sensitivity average value can be calculated by the following formulas:

$$P_{r_{ave}} = \frac{1}{m+1} \sum_{i=1}^{m} \sum_{j=1}^{n} p_r(\theta_i, \phi_j);$$

$$p_{s_{ave}} = \frac{1}{m+1} \sum_{i=1}^{m} \sum_{j=1}^{n} p_s(\theta_i, \phi_j);$$

In the formulas, $P_{r_{ave}}$ is the radiated power average value, $P_{save}$ is the sensitivity average value, m is the number of the azimuth angles in the present measuring space range, n is the number of the pitch angles in the preset measuring space range, $p_r(\theta_i, \phi)$ represents the antenna system radiated power linearly represented at the $i^{th}$ azimuth angle and the $j^{th}$ pitch angle, and $p_s(\theta_i, \phi)$ represents the receiving sensitivity linearly represented at the $i^{th}$ azimuth angle and the $j^{th}$ pitch angle.

Further, the radiated power average value and the sensitivity average value may be converted into a logarithmic form, and the conversion result is displayed, where the conversion result may be:

$$P_{r_{ave}}=10 \log_{10}(P_{r_{ave}});$$

$$P_{s_{ave}}=10 \log_{10}(P_{s_{ave}});$$

In the formulas, $P_{r_{ave}}$ is the radiated power average value in the logarithmic form, and $P_{s_{ave}}$ is the sensitivity average value in the logarithmic form.

By the above mode, the radiated power average value and the sensitivity average value in the logarithmic form can be calculated and displayed, the antenna system radiated power and the receiving sensitivity measured in the preset measuring space range can be calculated, so that the calculated radiated power average value and sensitivity average value can reflect the transmitting ability and the receiving ability of the vehicle antenna system more accurately.

In another example, the method provided by the embodiments of the present disclosure further includes:

a plurality of sampling point radiated powers in a preset measuring space range are determined according to the antenna system radiated power of the vehicle antenna system in each vehicle body attitude; and the near horizontal part radiated power of the vehicle antenna system in the preset measuring space range can be determined based each sampling point radiated power.

Specifically, hemispherical measurement can be assumed, where there are N $\theta$ intervals and M $\phi$ intervals, and each sampling point radiated power in the preset measuring space range can be calculated according to the following formula:

$$cut_i \cong \sum_{j=0}^{M-1} [EIRP_\theta(\theta_i, \phi_j) + EIRP_\phi(\theta_i, \phi_j)]\sin(\theta_i);$$

In the formula, $cut_i$ is the sampling point radiated power of the $i^{th}$ azimuth angle, $EIRP_\theta(\theta_i; \phi_j)$ is the antenna system radiated power at the azimuth angle $\theta_i$ and the pitch angle; $\phi_j$ during measurement according to the interval $\theta$, and $EIRP_\phi(\theta_i, \phi_j)$ is the antenna system radiated power at the azimuth angle $\theta_i$ and the pitch angle $\phi$, during measurement according to the interval $\phi$.

Further, the near horizontal part radiated power (NHPRP) of the vehicle antenna system in the preset measuring space range can be calculated in combination with all the sampling point radiated powers.

Exemplarily, taking the whole vehicle cellular mobile communication test as an example, $NHPRP_{45}$ and $NHPRP_{30}$ may respectively take the EIRP results in the range of 45°-90° or 60°-90°:

$$NHPRP_{45} \cong \frac{\pi}{2NM}\left(\sum_{i=3}^{6} cut_i\right);$$

$$NHPRP_{30} \cong \frac{\pi}{2NM}\left(\sum_{i=4}^{6} cut_i\right);$$

By the above method, the near horizontal part radiated power of the vehicle antenna system can be calculated, and the performance of the vehicle antenna system can be reflected more comprehensively through the calculated near horizontal part radiated power.

In another example, the method provided by the embodiments of the present disclosure further includes:
- a plurality of sampling point sensitivities in a preset measuring space range are determined according to the receiving sensitivity of the vehicle antenna system in each vehicle body attitude; and the near horizontal part receiving sensitivity of the vehicle antenna system in the preset measuring space range can be determined based each sampling point sensitivity.

Specifically, hemispherical measurement can be assumed, where there are N θ intervals and M φ intervals, and each sampling point sensitivity in the preset measuring space range can be calculated according to the following formula:

$$cut_i \cong \sum_{j=0}^{M-1}\left[\frac{1}{EIS_\theta(\theta_i, \phi_j)} + \frac{1}{EIS_\phi(\theta_i, \phi_j)}\right]\sin(\theta_i);$$

In the formula, $cut_i$ is the sampling point radiated power of the $i^{th}$ azimuth angle, $EIS_\theta(\theta_i; \phi_j)$ is the receiving sensitivity at the azimuth angle $\theta_i$ and the pitch angle $\phi_j$ during measurement according to the interval θ, and $EIS_\phi(\theta_i; \phi_j)$ is the receiving sensitivity at the azimuth angle $\theta_i$ and the pitch angle $\phi_j$ during measurement according to the interval φ.

Further, the near horizontal part receiving sensitivity (NHPRS) of the vehicle antenna system in the preset measuring space range can be calculated in combination with all the sampling point sensitivities.

Exemplarily, taking the whole vehicle cellular mobile communication test as an example, $NHPRS_{45}$ and $NHPRS_{30}$ may respectively take the effective receiving sensitivity (ERS) results in the range of 45°-90° or 60°-90°:

$$NHPRS_{45} \cong \frac{2NM}{\pi\left(\frac{\sqrt{2}}{16}cut_1 + \frac{\sqrt{2}+6\sqrt{3}}{16}cut_2 + cut_3\right)};$$

$$NHPRS_{30} \cong \frac{2NM}{\pi(cut_2 + cut_3)};$$

By the above method, the near horizontal part receiving sensitivity of the vehicle antenna system can be calculated, and the performance of the vehicle antenna system can be reflected more comprehensively through the calculated near horizontal part receiving sensitivity.

The present disclosure has the following technical effects: the rotating angle of the rotary table in the OTA test system, the rotating angle of the vehicle fixing turntable and the rotating angle of the rotating shaft are controlled by the vehicle attitude controller in the OTA test system, so that the current vehicle body attitude of the vehicle to be tested and placed on the vehicle fixing turntable is obtained, the vehicle antenna system in the vehicle to be tested is controlled to transmit the first test signal, the first test signal passes through the reflecting surface and the feed antenna in the OTA test system and then arrives at the measuring device; the average carrier power is obtained; the antenna system radiated power of the vehicle antenna system in the current vehicle body attitude is determined based on the average carrier power, so that the radiated power of the whole vehicle system can be tested; the feed antenna is controlled to transmit the second test signal, so that the second test signal passes through the reflecting surface and arrives at the vehicle antenna system; the transmitting power of the second test signal is adjusted by the measuring device until the packet loss rate of the vehicle antenna system reaches the preset value; the current transmitting power is recorded, so that the receiving sensitivity of the vehicle antenna system in the current vehicle body state is determined, and the receiving sensitivity of the whole vehicle antenna system can be tested; according to the method, the whole vehicle antenna system is subjected to attitude adjustment and test, so that the radio frequency performance of the physical layer of the whole vehicle antenna system can be tested, and the problem in the prior art that the test result of the parts cannot accurately reflect the performance of the whole vehicle antenna system; in addition, according to the method, the radiated powers and the receiving sensitivities of the whole vehicle antenna system in different vehicle body attitudes can be tested, so that the transmitting ability and the receiving ability of the whole vehicle antenna system can be tested, and the stability and reliability of the communication performance of the intelligent connected vehicle antenna system can be effectively ensured.

Figure 5:
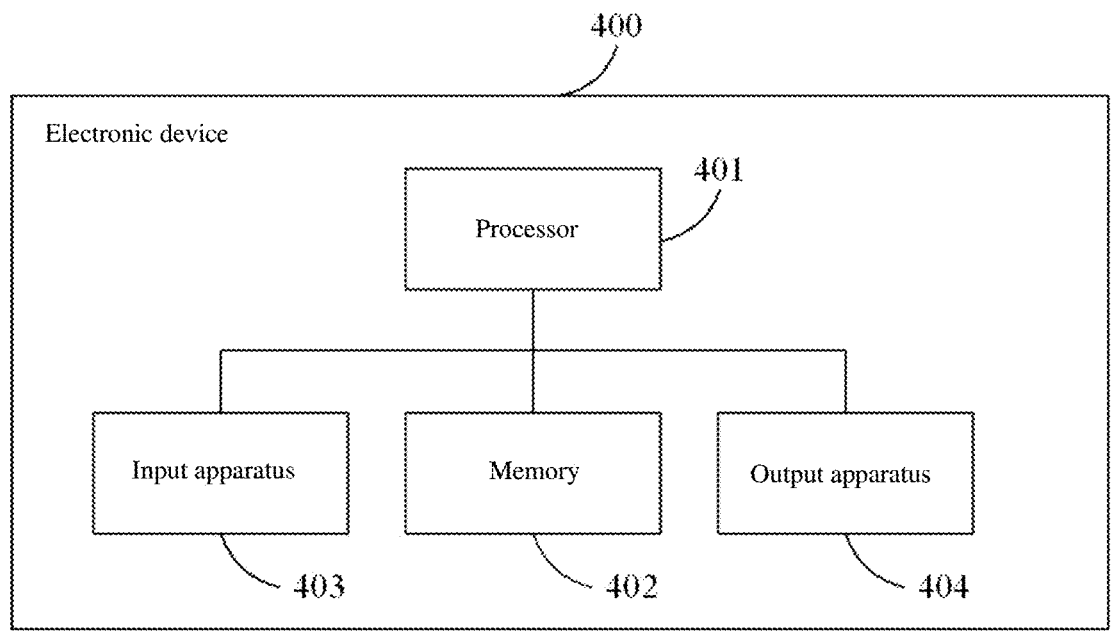
FIG. 5 is a structural schematic diagram of an electronic device according to an embodiment of the present disclosure.

FIG. 5 is a structural schematic diagram of an electronic device according to an embodiment of the present disclosure. As shown in FIG. 5, the electronic device 400 includes one or more of processors 401, and a memory 402.

The processor 401 may be a central processing unit (CPU) or other forms of processing units with the data processing ability and/or the instruction executing ability, and can control other assemblies in the electronic device 400 to perform the expected function.

The memory 402 may include one or more of computer program products. The computer program products may include various forms of computer-readable storage media, such as volatile memories and/or non-volatile memories. The volatile memories may include, for example, a random access memory (RAM) and/or cache memory. The non-volatile memories may include, for example, a random access memory (RAM), a hard disc and a flash memory. The computer-readable storage medium may store one or more of computer program instructions. The processor 401 may run the program instructions to implement the over the test method for the vehicle antenna system according to any embodiment of the present disclosure and/or other expected functions. Various contents such as an initial external parameter and a threshold may further be stored in the computer-readable storage medium.

In one example, the electronic device 400 may further include: an input apparatus 403 and an output apparatus 404. These assemblies are interconnected through a bus system and/or other forms of connecting mechanisms (not shown). The input apparatus 403 may include, for example, a keyboard, a mouse and the like. The output apparatus 404 may output various information to the outside, including early warning prompt information and braking force. The output apparatus 404 may include a display, a loudspeaker, a printer, and a communication network and a remote output device connected thereto.

Certainly, for simplification, FIG. 5 only shows some assemblies related to the present disclosure in the electronic device 400, and assemblies such as a bus and an input/output interface are omitted. In addition to this, according to the specific application, the electronic device 400 may further include any other appropriate assemblies.

In addition to the method and device, the embodiments of the present disclosure may further be a computer program product, including a computer program instruction. When the computer program instruction is run by a processor, the processor performs the steps of the OTA test method for the vehicle antenna system provided by any embodiment of the present disclosure.

The computer program product may write program codes for performing the operations of the embodiments of the present disclosure in one or a combination of more programming languages. The programming languages include object-oriented programming languages such as Java, Smalltalk, C++, and may further include conventional procedural programming languages such as "C" language or similar programming languages. The program codes may be completely executed in user computing equipment, partially executed in user equipment, executed as an independent software package, partially executed in the user computer equipment and partially executed in remote computer equipment, or completely executed in remote computing equipment or a server.

In addition, the embodiment of the present disclosure may further be a computer-readable storage medium. The computer-readable storage medium stores a computer program instruction. When the computer program instruction is run by a processor, the processor perform the steps of the OTA test method for the vehicle antenna system provided by any embodiment of the present disclosure.

The computer-readable storage medium may adopt any combination of one or any combination of more readable mediums. The readable medium may be a readable signal medium or a readable storage medium. The readable storage medium may include, but is not limited to, an electronic, magnetic, optical, electromagnetic, infrared, or semiconductor system, apparatus or device, or any combination of the above. More specific examples (a non-exhaustive list) of the readable storage medium may include: an electrically connected and portable disc with one or more wires, a hard disc, a random access memory (RAM), a read-only memory (ROM), an erasable programmable read-only memory (EPROM) or a flash memory, an optical fiber, a compact disc read-only memory (CD-ROM), an optical storage device, and a magnetic storage device that are each electrically connected through one or more wires, or any suitable combination of the above.

It should be noted that the terms used in the present disclosure are merely for describing specific embodiments, rather than limiting the embodiments of the present disclosure. As shown in the specification of the present disclosure, unless the context clearly suggests an exception, the words such as "a", "an", "one" and/or "the" do not refer to the singular, or may include the plural. The terms "include", "comprise", or any variants thereof are intended to cover a non-exclusive inclusion, so that a process, method, article, or device that includes a series of elements not only includes those elements, but also includes other elements not listed explicitly, or includes inherent elements of the process, method or device. In the absence of more limitations, an element defined by "include a . . . " does not exclude other same elements existing in the process, method or device including the element.

It should be further noted that orientations or positional relationships indicated by terms, such as "center", "upper", "lower", "left", "right", "vertical", "horizontal", "inner", "outer", "front" and "rear" are based on orientations or positional relationships shown in the drawings, are to facilitate the description of the present disclosure and simplify the description merely, do not indicate or imply that the referred apparatuses or elements must have specific orientations and are constructed and operated in the specific orientations and thus should not be construed to limit the present disclosure. Unless otherwise clearly specified and defined, the terms "mount", "interconnect" and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the above terms in the present disclosure may be understood according to specific situations.

Finally, it should be noted that: the above embodiments are merely used for illustrating the technical solutions of the present disclosure, but do not limit them; although the present disclosure has been described in detail with reference to the foregoing examples, those of ordinary skills in the art should understand that: the technical solutions recorded in the foregoing embodiments may still be modified, or some of the technical features therein may be equivalently substituted; however, these modifications or substitutions do not separate the essence of the corresponding technical solutions from the spirit and scope of the technical solutions of the embodiments of the present disclosure.

What is claimed is:

1. An over the air (OTA) test method for a vehicle antenna system, applied to an OTA test system, wherein the OTA test system comprises a reflecting surface, a reflecting surface bracket, a feed antenna, a feed turntable, a feed fixing bracket, a feed lifting apparatus, a feed sliding track, a feed switcher, a feed bracket controller, a rotary table, a left lifting arm, a right lifting arm, a vehicle fixing turntable, a rotating shaft, a driving motor, a vehicle attitude controller and a measuring device; the feed turntable is configured to mounting a plurality of probes of the feed antenna; the feed switcher is configured to control the feed turntable to rotate; the feed antenna required to be used is rotated to a focus of the reflecting surface; the rotary table rotates along an X axis in a vehicle head direction; the vehicle fixing turntable rotates along a Z axis in a vehicle top direction; the rotating shaft rotates along a Y axis in a lateral direction of the vehicle; the measuring device comprises a feed connecting port and an antenna system connecting port; the feed connecting port is connected to the feed turntable; the antenna system connecting port is connected to the vehicle antenna system;

the method comprises:
controlling, by the vehicle attitude controller, a rotating angle of the rotary table, a rotating angle of the vehicle fixing turntable and a rotating angle of the rotating shaft to obtain a current vehicle body attitude of the vehicle to be tested and placed on the vehicle fixing turntable;
controlling the vehicle antenna system in the vehicle to be tested to transmit a first test signal to enable the first test signal to pass through the reflecting surface and the feed antenna and arrive at the measuring device, obtaining an average carrier power, and determining the antenna system radiated power of the vehicle antenna system in the current vehicle body attitude based on the average carrier power; and
controlling the feed antenna to transmit a second test signal to enable the second test signal to pass through the reflecting surface and arrive at the vehicle antenna system, adjusting the transmitting power of the second test signal by the measuring device until the packet loss rate of the vehicle antenna system reaches a preset value, recording a current transmitting power, and determining a receiving sensitivity of the vehicle antenna system in the current vehicle body attitude based on the current transmitting power;

wherein the method further comprises:

measuring, by the measuring device, the reflection coefficient of a reference antenna placed on the vehicle fixing turntable;

measuring, by the measuring device, a cable loss from the feed connecting port to the reference antenna, and obtaining a first path loss from the feed connecting port to the antenna position corresponding to the reference antenna based on the reflection coefficient and the cable loss;

connecting a cable between the reference antenna and the antenna system connecting port, and measuring, by the measuring device, an OTA path loss from the feed connecting port to the antenna system connecting port; and obtaining a second path loss from the antenna position corresponding to the reference antenna to the antenna system connecting port based on the OTA path loss and the first path loss.

2. The method according to claim 1, wherein the determining the antenna system radiated power of the vehicle antenna system in the current vehicle body attitude based on the average carrier power comprises:

determining the sum of the average carrier power and the first path loss as a first radiated power measured by the feed connecting port;

determining the sum of the average carrier power and the second path loss as a second radiated power measured by the antenna system connecting port; and determining an antenna system radiated power of the vehicle antenna system in the current vehicle body attitude according to the sum of the first radiated power and the second radiated power.

3. The method according to claim 1, wherein the determining a receiving sensitivity of the vehicle antenna system in the current vehicle body attitude based on the current transmitting power comprises:

determining a difference between the current transmitting power and the first path loss as a first sensitivity measured by the feed connecting port;

determining a difference between the current transmitting power and the second path loss as a second sensitivity measured by the antenna system connecting port; and determining a sum of the first sensitivity and the second sensitivity as the receiving sensitivity of the vehicle antenna system in the current vehicle body attitude.

4. The method according to claim 1, further comprising:

determining a radiated power average value and a sensitivity average value according to the antenna system radiated power and the receiving sensitivity of the vehicle antenna system in each vehicle body attitude; and converting the radiated power average value and the sensitivity average value into a logarithmic form, and displaying the conversion result.

5. The method according to claim 1, further comprising:

determining a plurality of sampling point radiated powers in a preset measuring space range according to the antenna system radiated power of the vehicle antenna system in each vehicle body attitude; and determining a near horizontal part radiated power of the vehicle antenna system in the preset measuring space range based on each of the sampling point radiated powers.

6. The method according to claim 1, further comprising:

determining a plurality of sampling point sensitivities in a preset measuring space range according to the receiving sensitivity of the vehicle antenna system in each vehicle body attitude; and determining a near horizontal part receiving sensitivity of the vehicle antenna system in the preset measuring space range based on each of the sampling point sensitivities.

7. The method according to claim 1, before the controlling, by the vehicle attitude controller, the rotating angle of the rotary table, the rotating angle of the vehicle fixing turntable and the rotating angle of the rotating shaft, the method further comprising:

controlling, by the feed switcher, the feed turntable to rotate to switch the feed antenna on the feed turntable; or controlling, by the feed bracket controller, the feed lifting apparatus located below the feed fixing bracket to slide on the feed sliding track so as to adjust the horizontal position of the feed antenna, and controlling the feed lifting apparatus to move up and down so as to adjust a height and a pitch angle of the feed antenna.

8. An electronic device, comprising:

a processor and a memory, wherein the processor is configured to perform the steps of the OTA test method for the vehicle antenna system according to claim 1 by calling a program or an instruction stored by the memory.

9. A non-transitory computer-readable storage medium, wherein the computer-readable storage medium stores a program or an instruction, and the program or instruction enables a computer to perform the steps of the OTA test method for the vehicle antenna system according to 1.

* * * * *